United States Patent
Hochmuth

Patent Number: 6,000,217
Date of Patent: Dec. 14, 1999

[54] AIR INJECTION STRATEGIES FOR EFFECTIVELY BURNING HYDROCARBONS RELEASED FROM A HYDROCARBON TRAP

[75] Inventor: John K. Hochmuth, Bridgewater, N.J.

[73] Assignee: Engelhard Corporation, Iselin, N.J.

[21] Appl. No.: 08/368,685

[22] Filed: Jan. 4, 1995

[51] Int. Cl.[6] ................................................. F01N 3/00
[52] U.S. Cl. ........................ 60/274; 60/297; 60/289; 60/285; 60/307
[58] Field of Search ............................ 60/274, 297, 311, 60/289, 307, 285

[56] References Cited

U.S. PATENT DOCUMENTS

| | | |
|---|---|---|
| 3,067,002 | 12/1962 | Reid et al. . |
| 3,779,015 | 12/1973 | Maruoka . |
| 3,791,143 | 2/1974 | Keith et al. . |
| 3,860,535 | 1/1975 | Johnson . |
| 3,929,418 | 12/1975 | Wood . |
| 3,929,419 | 12/1975 | Chapman . |
| 4,007,718 | 2/1977 | Laprade ................................ 60/285 |
| 4,171,287 | 10/1979 | Keith . |
| 4,985,210 | 1/1991 | Minami . |
| 5,051,244 | 9/1991 | Dunne et al. . |
| 5,125,231 | 6/1992 | Patil et al. . |
| 5,158,753 | 10/1992 | Take et al. . |
| 5,303,547 | 4/1994 | Mieville et al. . |
| 5,315,824 | 5/1994 | Takeshima ............................ 60/297 |
| 5,355,672 | 10/1994 | Adamczyk, Jr. et al. ............ 60/274 |
| 5,373,696 | 12/1994 | Adamczyk, Jr. et al. ............ 60/276 |
| 5,379,586 | 1/1995 | Honji et al. .......................... 60/297 |
| 5,388,405 | 2/1995 | Fujishita et al. .................... 60/297 |
| 5,524,433 | 6/1996 | Adamczyk ........................... 60/297 |

FOREIGN PATENT DOCUMENTS

| | | |
|---|---|---|
| 0592713 | 4/1994 | European Pat. Off. . |
| WO 94/11623 | 5/1994 | WIPO ................................ F01N 3/20 |

OTHER PUBLICATIONS

SAE Paper # 930,739—Hydrocarbon Traps for Controlling Cold Start Emissions—Hochmuth et al, Mar., 1993.
SAE Paper # 920,847—Cold–Start Hydrocarbon Collection for Advanced Exhaust Emission Control—Heimrich et al, Feb., 1992.

Primary Examiner—Thomas E. Denion

[57] ABSTRACT

An exhaust gas treatment method for an exhaust system that includes a hydrocarbon trap (16) disposed upstream of a downstream catalyst zone comprising a catalyst effective at least for the oxidation of unburned hydrocarbons, in which air is added to the exhaust gas stream in an amount that provides a stoichiometric air/fuel balance in the exhaust gas entering the downstream catalyst zone. The air may be added at any point upstream of the downstream catalyst zone, but optimum results are obtained when air is added between the trap (16) and the downstream catalyst zone. The addition of air can be controlled by the output of a sensor (26) that measures the air/fuel ratio of the exhaust gas, disposed downstream of the trap (16), or by the output of a thermocouple (18) disposed upstream of the trap.

21 Claims, 3 Drawing Sheets

AIR INJECTION STRATEGIES FOR EFFECTIVELY BURNING HYDROCARBONS RELEASED FROM A HYDROCARBON TRAP

BACKGROUND OF THE INVENTION

1. Field of the Invention

This invention relates to the reduction of noxious automotive emissions, and more particularly to the addition of air to the exhaust gas stream of an automotive engine to combust unburned and partially burned hydrocarbons.

In order to meet Governmental emissions standards for internal combustion engine exhaust, motor vehicle manufacturers emplace catalytic converters in the exhaust gas lines of their vehicles. A common form of converter comprises a catalyst member which comprises a honeycomb monolith having gas flow passages extending therethrough. The monolith carries a coating of catalytically active material which is effective to convert noxious components of the exhaust gas, which may include unburned hydrocarbons, carbon monoxide and $NO_X$ to innocuous substances. A common type of catalytic material comprises catalytically effective amounts of platinum group metals dispersed on a refractory inorganic oxide support material such as alumina, ceria and zirconia. Three-way catalysts are known for their ability to substantially simultaneously oxidize unburned hydrocarbons and carbon monoxide to $CO_2$ and $H_2O$ while reducing $NO_X$.

Three-way catalysts, like more conventional oxidation catalysts, are generally not effective until they have been heated to a threshold temperature often identified as the "light-off" temperature. Ordinarily, during the operation of an automotive engine, the exhaust gases heat the catalytic converter to the light-off temperature within a few minutes of operation. However, during those initial minutes of operation known as the "cold-start" period, the engine and the exhaust system apparatus are cold, so the exhaust gases are relatively cold and quickly transfer the little heat they contain to heat the catalytic converter and other components of the exhaust system. During the cold-start period, the exhaust gases are rich in unburned hydrocarbons, which pass through the cold catalytic converter unaffected. Recently, efforts have been made to reduce cold-start emissions, including incorporating an adsorbent hydrocarbon trap in the exhaust gas line. Such traps allow the exhaust gases to flow in contact with an adsorbent material, e.g., a molecular sieve, which adsorbs and thus retains the hydrocarbons during the cold-start period. When the adsorbent is heated, however, it releases the previously trapped hydrocarbons. By that time, however, the engine will be heated to its steady operation temperature and the catalytic converter will be at or near its light-off temperature, so that at least some of the desorbed hydrocarbons, which otherwise would have passed through the catalytic converter untreated, will be oxidized to less noxious species. However, since engines are generally run on a stoichiometric air/fuel combustion mixture, the desorption of hydrocarbons into the exhaust gases causes the exhaust gases to become fuel-rich, and thus prevents optimum catalyst performance.

2. Related Art

The prior art teaches that three-way catalysts are best used for treating CO, unburned hydrocarbons and $NO_X$ by maintaining the air/fuel ratio of the engine combustion mixture at a stoichiometric balance, i.e., a balance in which there is sufficient oxygen to fully combust the hydrocarbons without leaving unreacted oxygen. This allows for the complete combustion of the carbonaceous components of the fuel to proceed substantially simultaneously with the reduction of $NO_X$. Accordingly, automobiles are equipped with engine control modules that control fuel injectors to attain the desired air/fuel balance. However, variations from stoichiometric air/fuel operation frequently occur, e.g., during acceleration and deceleration. It is generally accepted that when the combustion mixture is lean, there will be excess oxygen in the exhaust gas, and the activity of the three-way catalyst will favor oxidation of hydrocarbons and carbon monoxide. See, e.g., U.S. Pat. No. 4,171,287 to Keith at column 11, lines 29–47, where the conventional air/fuel ratio index variable A is used to relate a given air/fuel mixture to a stoichiometric air/fuel mixture, which has an air/fuel weight ratio of 14.65 for a fuel with H/C ratio of 1.90. For a lean air/fuel mixture, $\lambda>1$; for a stoichiometric mixture, $\lambda=1$; for a fuel-rich mixture, $\lambda<1$.

In SAE Paper 930739, Hochmuth et al disclose in FIG. 8 a number of exhaust configurations in which a hydrocarbon trap is disposed between catalyst zones defined by discrete catalytic converters or passes of a heat exchange cross-flow monolith having three-way catalyst material in both passes. The Paper teaches the addition of air into the exhaust gas stream to burn desorbed hydrocarbons, and teaches the injection of air at a point downstream from the hydrocarbon trap to assist in the combustion of desorbed hydrocarbons in a catalyst zone further downstream from the trap.

U.S. Pat. No. 3,929,418 to Wood, dated Dec, 30, 1975, discloses a crossflow catalyst monolith mounted in a canister, in which the monolith defines a first catalyst zone for the reduction of nitrogen oxides and a second catalyst zone for the oxidation of carbon monoxide and unburned hydrocarbons, and teaches the injection of air into the exhaust gas stream at a point between the catalyst zones, to assist in oxidation in the second catalyst zone. Similar arrangements are taught in U.S. Pat. No. 3,860,535 (see column 3, lines 24 through 42) and U.S. Pat. No. 3,929,419 (see column 3, lines 51 through 63).

U.S. Pat. No. 5,051,244 to Dunne et al, dated Sep. 24, 1991, shows a valve-operated exhaust system in which, during the cold-start period of engine operation, exhaust gases are flowed through an adsorbent and then through a three-way catalyst. When the catalyst reaches its light-off temperature, the valves are used to bypass the adsorbent zone. A minor part of the hot exhaust gases is used to desorb hydrocarbons from the adsorbent and to flow them to the catalyst. There is no suggestion regarding the addition of air into the exhaust gas stream other than that which is required to combust the fuel.

Some automobiles employ a "fuel cut" mode of engine operation during deceleration, in which the fuel injectors are completely closed, forcing a large excess of air through the exhaust system which can combust adsorbed hydrocarbons.

SUMMARY OF THE INVENTION

The present invention provides an improvement in a method for treating automotive exhaust gases that comprises flowing the exhaust gases at least through a hydrocarbon trap that adsorbs hydrocarbons during a cold-start period and desorbs hydrocarbons during a subsequent operation period, and then through a catalyst zone comprising a catalyst effective at least for the oxidation of hydrocarbons. The improvement comprises adding supplemental air to the exhaust gases during the hydrocarbon desorption period of the trap to maintain a substantially stoichiometric balance in the exhaust gases flowing into the downstream catalyst zone.

According to one aspect of the invention, the step of adding supplemental air may comprise increasing the air content of the combustion mixture for the engine.

According to another aspect of the invention the step of adding supplemental air to the exhaust gas may comprise adding air at a point downstream of the trap.

Optionally, the improvement may comprise sensing the quantity of desorbed hydrocarbons and the step of adding supplemental air may comprise adding air at a rate that provides substantially stoichiometric balance with the sensed quantity of hydrocarbons in the exhaust gas, including desorbed hydrocarbons. Sensing the quantity of desorbed hydrocarbons may comprise sensing the hydrocarbon content, or the oxygen/unburned hydrocarbon ratio, of the exhaust gases flowing out of the trap, or the temperature of the exhaust gases flowing into the trap.

Optionally, the method may include flowing the exhaust gases through an upstream catalyst zone comprising a catalyst effective to convert one or more of carbon monoxide, hydrocarbons and nitrogen oxides to innocuous substances, the upstream catalyst zone being upstream of the trap. In one embodiment, the upstream and the downstream catalyst zones may be in mutual heat exchange relation with each other and the trap may be disposed in the exhaust gas stream at a point between the catalyst zones of the heat exchange catalyst member.

The invention also provides an improvement for an exhaust gas treatment system defining a flow path for an exhaust gas stream and comprising at least a hydrocarbon trap in the flow path downstream of the first catalyst zone that adsorbs and desorbs hydrocarbons and a catalyst disposed in the flow path downstream of the trap effective at least for oxidizing hydrocarbons. The improvement comprises providing a sensor/controller means operably connected to the treatment system for sensing when the trap is desorbing hydrocarbons, for sensing the quantity of hydrocarbons in the exhaust gas stream, including desorbed hydrocarbons, and for issuing an air injection signal when the exhaust gas stream is fuel-rich. Air injection means responsive to the air injection signal of the sensor/controller means is also provided, for increasing the air content of the exhaust gas stream so that a substantially stoichiometric exhaust gas mixture flows to the downstream catalyst zone.

According to one aspect of the invention the sensor/controller means may comprise one of an air/fuel ratio sensor and a hydrocarbon sensor. An air/fuel ratio sensor may be connected to the system at a point downstream of the point where the air injection means adds air to the exhaust gas stream.

According to another aspect of the invention, the air injection means may comprise an engine control module that is responsive to the sensor means, to run the engine lean while hydrocarbons are being desorbed from the trap. Optionally, the air injection means may comprise an air pump for injecting air into the flow path at a point downstream from the trap.

In any of the foregoing embodiments, the downstream catalyst zone may comprise either a three-way catalyst capable of reducing nitrogen oxides as well as combusting unburned hydrocarbons or a catalyst material which consists essentially of an oxidation catalyst.

As used herein and in the claims, the term "unburned hydrocarbons" is meant to encompass both unoxidized hydrocarbons and partially oxidized hydrocarbons.

DETAILED DESCRIPTION OF THE INVENTION AND PREFERRED EMBODIMENTS THEREOF

The present invention relates to a method for reducing hydrocarbon emissions from an automotive engine, from which the exhaust gases are flowed through an exhaust treatment system comprising at least a hydrocarbon trap and, downstream from the trap, a catalyst zone comprising a catalyst effective at least for the oxidation of hydrocarbons. Optionally, there may be one or both of an upstream catalyst zone and a preliminary catalyst zone disposed upstream of the trap. Contrary to the belief in the prior art that an excess of air in the exhaust gas stream would favor oxidation of hydrocarbons in the downstream catalyst zone whether the downstream catalyst zone comprises a three-way catalyst or merely an oxidation catalyst, the present invention is based on the surprising discovery that hydrocarbon emissions can be optimally reduced by limiting the quantity of air added to the exhaust gas stream to that which provides a stoichiometric balance between oxidizing constituents such as oxygen, $NO_X$ and the like, and reducing constituents such as carbon monoxide, unburned hydrocarbons, and the like, in the exhaust gas flowing to the downstream catalyst zone. It has also been discovered that emissions can be reduced by the strategic choice of where the air is introduced into the exhaust gas stream. These objects can be achieved as taught herein by use of a so-called "passive" exhaust system, which is free from bypass lines or valved operation other than that necessary to add air to the exhaust gas stream as taught herein.

As indicated above, a combustion mixture in which the air and fuel is stoichiometrically balanced is described as having an air/fuel ratio index of $\lambda=1$. Such a combustion mixture would be expected, under ideal conditions, to produce an exhaust gas in which all the oxygen combined with all the carbon species in the fuel to produce carbon dioxide and water without having formed $NO_X$. As a practical matter, engines do not completely combust fuel, so the stoichiometrically balanced combustion mixture yields products of partial combustion, including oxidizing and reducing constituents. The oxidizing and reducing constituents in the exhaust gas, however, are stoichiometrically balanced, so that the combustion reaction can be driven forward, e.g., by the use of environmental catalysts, to yield an exhaust gas more nearly resembling the product of complete, stoichiometrically balanced combustion. Since the composition of the exhaust gas from a combustion mixture retains the stoichiometric balance of the combustion mixture, it is described as having an air fuel ratio index that is the same as that of the combustion mixture. Thus, the exhaust gas produced from a combustion mixture having an air/fuel ratio index of λ=1 is said to yield exhaust gas having an air/fuel-ratio index of λ=1. It is known in the art to employ an air/fuel ratio sensor to indicate the air/fuel ratio index of exhaust gas.

One method for sensing when to add supplemental air to an exhaust gas stream according to the present invention is to incorporate an air/fuel ratio sensor that is effective to indicate the stoichiometry of the exhaust gas, or a hydrocarbon-specific sensor, in the exhaust gas stream at a point downstream from the hydrocarbon trap. In this way, as hydrocarbons desorb from the trap, the sensor produces an output signal which can be used to control the addition of air in a quantity designed to stoichiometrically balance the measured quantity of desorbed hydrocarbons in the exhaust gas stream. Another method for determining when and to what degree hydrocarbons are being desorbed from the trap is to monitor temperature of the exhaust gas stream at the trap inlet, since there is a clear relationship between the desorption of hydrocarbons and the temperature of the exhaust gas stream.

The supplemental air may be added by any convenient means. For example, the supplemental air may be added by using the output of the sensor to control the air content of the air/fuel combustion mixture being fed to the engine so that as hydrocarbons are being desorbed from the trap, the air/fuel combustion mixture being fed to the engine is slightly lean rather than stoichiometric. An excess of air relative to the fuel flowing to the engine will thus be introduced to the engine, and will provide oxygen in an amount that exceeds a stoichiometric balance with the fuel, the excess oxygen being present in an amount that provides a stoichiometric balance when mixed with the desorbed hydrocarbons downstream of the trap. A preferred method of adding supplemental air to the exhaust gas stream comprises introducing air, by means of a pump or similar device, into the exhaust system downstream from the engine, preferably at a point downstream of the trap but upstream of the downstream catalyst zone. It has been found that by introducing air at this point, hydrocarbon emissions will be less than if the air is introduced at other points in the exhaust system.

Figure 1:
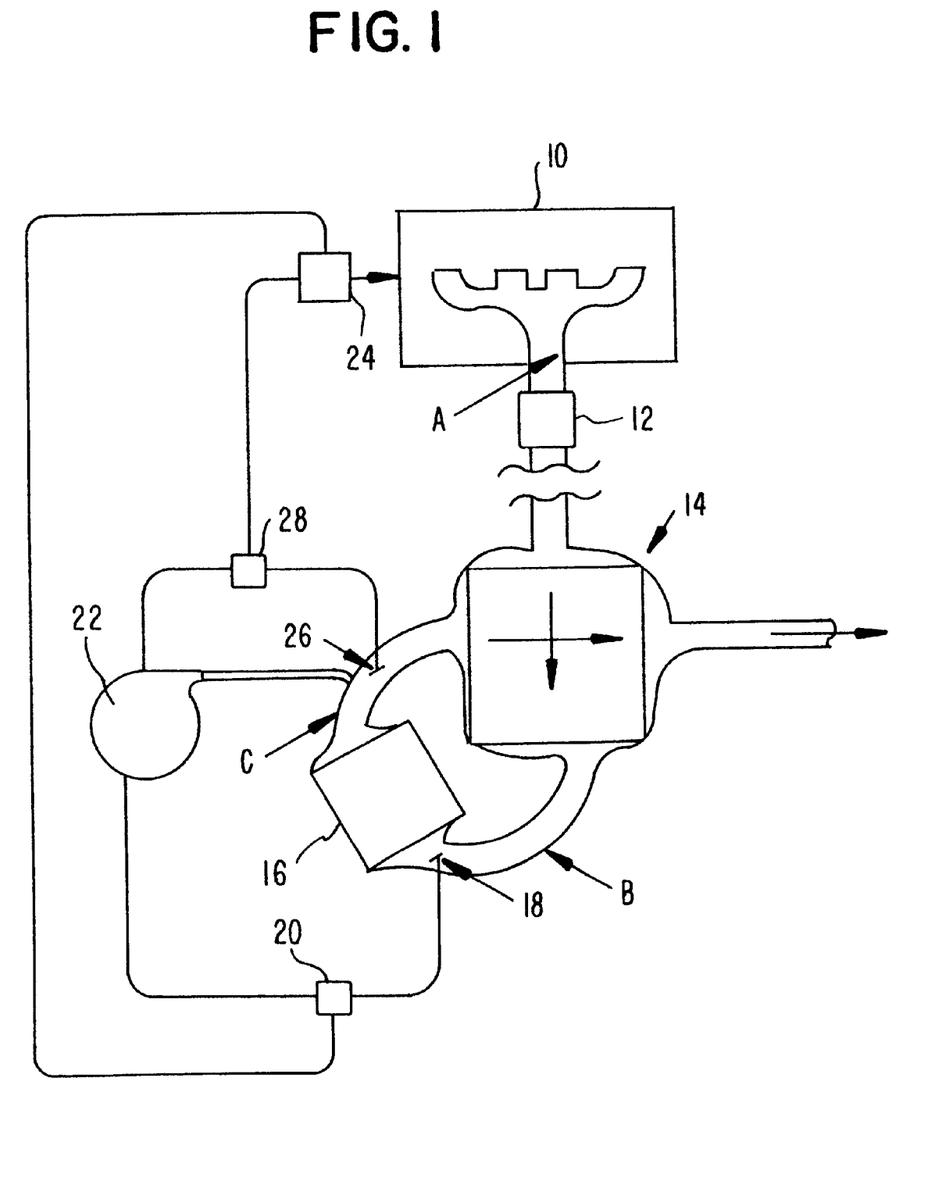
FIG. 1 is a schematic representation of an exhaust system according to one embodiment of the present invention.

An automotive exhaust system in accordance with one embodiment of the present invention is shown schematically in FIG. 1. Exhaust from engine 10 is directed through a manifold to an optional preliminary catalyst 12. A gas flow line connects preliminary catalyst 12 with crossflow catalyst member 14. Preliminary catalyst 12 may comprise a low-mass oxidation catalyst, which due to its small size and proximity to engine 10, reaches its light-off temperature sooner than a larger primary catalyst disposed downstream in a conventional under-the-floor position in the exhaust system. By oxidizing hydrocarbons at an early stage in engine operation, preliminary catalyst 12 reduces cold-start emissions and raises the temperature of the exhaust gases by releasing the exothermal heat of oxidation, and thus helps to hasten the heating of subsequent catalysts to their light-off temperatures.

Crossflow catalyst member 14 provides two distinct pluralities of gas-flow passages disposed in heat exchange relation to each other, all of which have catalytic material coated on the surfaces thereof. The first plurality of passages provides a first catalyst zone comprising a three-way catalyst material effective for the substantially simultaneous oxidation of carbon monoxide and hydrocarbons and the reduction of nitrogen oxides as described above.

The effluent from the first upstream (relative to trap 16) catalyst zone, is directed towards hydrocarbon trap 16, which comprises an adsorbent material effective to adsorb hydrocarbons in the exhaust gas stream at least during the cold-start period of operation.

The adsorbent material may include any known hydrocarbon adsorbents such as activated alumina, porous glass, silica gel and activated carbon. Natural and synthetic molecular sieves are particularly effective. Natural molecular sieves include faujasites, clinoptilolites, mordenites and chabazites. Zeolites, a class of molecular sieves, which can be used include silicalite, zeolite X, zeolite Y, ultrastable zeolite Y, ZSM-5, offretite, and the like. Generally, sieve materials having so-called three-dimensional pore configurations are preferred over sieve materials having one- or two-dimensional pore configurations, although some of the latter function acceptably well. Acceptable materials typically have a micro-pore diameter of from about 3 to 8 Angstroms. Beta-zeolites are preferred.

The adsorbent material may be deposited onto a solid monolithic carrier by methods known in the art. It is usually most convenient to apply the adsorbent as a thin film or coating deposited on an inert carrier material which provides the structural support for the adsorbent. The inert carrier material can be any refractory material such as ceramic or metallic materials. Alternatively, as is known in the art, the adsorbent may be provided in the form of pellets or beads disposed in a flow-through canister to provide an adsorbent bed through which the exhaust gases flow. In still other embodiments, the adsorbent material may be extruded or otherwise fabricated into monolithic form and disposed within the exhaust gas stream.

After leaving trap 16, the exhaust gases flow into the second plurality of passages, which provide a second catalyst zone. The second, downstream (relative to trap 16) catalyst zone comprises an oxidation catalyst effective for the conversion of carbon monoxide and unburned hydrocarbons to innocuous substances and, in one embodiment, it may be substantially free of catalytic components used elsewhere for the reduction of nitrogen oxides. For example, the downstream catalyst zone may be substantially free of rhodium. Such catalysts generally comprise one or more platinum group metals other than rhodium, e.g., platinum and/or palladium deposited on a refractory metal oxide such as alumina, ceria, zirconia, or the like. In an alternative embodiment, the downstream catalyst zone may comprise a three-way catalyst, in which case the invention provides an added advantage, discussed below. Gases leaving the second catalyst zone are then flowed into the tailpipe. The exhaust system thus defines a gas flow path from engine 10, through the optional preliminary catalyst 12, through the first catalyst zone, through trap 16, then through the second catalyst zone, and to the tail pipe.

A thermocouple 18 is operably connected to the exhaust system to sense the temperature of the exhaust gases in the flow path at a point upstream of trap 16. The signal produced by thermocouple 18 is sensed by temperature controller 20. Temperature controller 20 is operably connected to an air pump 22 which is configured to inject air into the exhaust gas stream at a point upstream of the second catalyst zone. Optionally, temperature controller 20 is operably connected to an engine control module 24 which controls the air/fuel mixture fed to engine 10, as shown. By prior study of the inlet temperature-desorption rate characteristics of the adsorbent material in trap 16, the temperature profile of the exhaust flow gases flowing into trap 16, as sensed by temperature controller 20, can be used by temperature controller 20 to control one or both of air pump 22 and engine control module 24 by issuance of an air injection signal thereto, to add supplemental air into the exhaust gas stream. Engine control module 24 adds air to the exhaust gas stream by increasing the air content of the air/fuel mixture supplied to the engine by the fuel injector (not shown). As will be appreciated from FIG. 1, both air pump 22 and engine control module 24 are positioned to add air to the exhaust gas stream at a point upstream of the second catalyst zone provided by crossflow catalyst member 14.

The exhaust system of FIG. 1 further comprises a sensor 26 disposed in the exhaust flow path downstream of trap 16, and preferably downstream of the point where air is injected into the exhaust gas stream. Sensor 26 may be a hydrocarbon level sensor or, preferably, an air/fuel ratio sensor. Sensor 26 is connected to sensor controller 28, and is equipped to issue an air injection signal to one or both of air pump 22 and engine control module 24 when sensor 26 indicates that hydrocarbons are being desorbed from trap 16. For example, when sensor 26 is an air/fuel ratio sensor and it indicates that the exhaust gases are fuel-rich, i.e., that there is a deficit of oxygen in the exhaust gas, at a time when engine control module 24 is running the engine on a substantially stoichiometric air/fuel combustion mixture, this indicates that hydrocarbons are being desorbed from trap 16. Sensor controller 28 may then issue an air injection signal to one or both of air pump 22 and engine control module 24 to add supplemental air to the exhaust gases until sensor 26 indicates that the exhaust gas has a stoichiometric composition. Sensor 26 is preferably located at a point downstream of the point at which air is added to the exhaust gas stream, so that it can reduce or cancel the air injection signal when it senses that the air/fuel ratio of the exhaust gas is substantially stoichiometric or lean. Sensor 26 and sensor controller 28 can be employed in conjunction with, or instead of, thermocouple 18 and temperature controller 20.

In use, when the operation of engine 10 is initiated during a cold-start period, exhaust gas flows through preliminary catalyst 12 and then through the first catalyst zone provided by crossflow heat exchange catalyst member 14. During the cold-start period, the exhaust gas contains unburned hydrocarbons that pass through the first catalyst zone unaffected. At least some of the unburned hydrocarbons are adsorbed onto the adsorbent material in hydrocarbon trap 16, and the exhaust gas, at least partially stripped of unburned hydrocarbons, flows through the second downstream catalyst zone provided by crossflow heat exchange catalyst member 14.

As engine operation continues and the temperature of the exhaust gas rises, the heat exchange relationship of the upstream and downstream catalyst zones in crossflow heat exchange catalyst member 14 allows the transfer of heat from the upstream catalyst zone to the downstream catalyst zone, thus accelerating the temperature rise of the oxidation catalyst in the downstream catalyst zone to its operative temperature. The rise in temperature of the exhaust gas also causes trap 16 to begin desorbing trapped hydrocarbons but this result is delayed since the exhaust gases are cooled somewhat by the heat transfer previously described. The desorption of hydrocarbons can be indicated by the rise in temperature measured by thermocouple 18 at the trap inlet or by the output of sensor 26.

In response to the eventual desorption of hydrocarbons from trap 16, temperature controller 20 and/or sensor controller 28 issues an air injection signal to one or both of air pump 22 and engine control module 24 to add supplemental air to the exhaust gas stream so that although the air/fuel ratio in the engine combustion mixture is lean, the air/fuel ratio in the exhaust gas stream is substantially stoichiometric as it enters the downstream catalyst zone. Since the supplemental air is added at a point or points upstream of the second, downstream catalyst zone, the exhaust gas flowing into the downstream catalyst zone has a substantially stoichiometric air/fuel ratio. As illustrated in the examples below, by maintaining a substantially stoichiometric air/fuel ratio in the gases flowing to the downstream catalyst zone, hydrocarbon emissions are optimally reduced. Eventually, the rate of hydrocarbon desorption from trap 16 falls off. This phenomenon can be predicted by temperature controller 20 by internal programming such as may be included in a ROM chip, or can be sensed by sensor 26. In either case, the associated controller adjusts the addition of supplemental air to balance the desorbed hydrocarbons to maintain a substantially stoichiometric air/fuel ratio in the exhaust gas entering the downstream catalyst zone.

Without wishing to be bound by any particular theory, it is believed that the prior art strategy of adding excess air for the combustion of the desorbed hydrocarbons diminishes the performance of the catalyst downstream of the hydrocarbon trap in two ways. First, since the exhaust gas stream entering the downstream catalyst zone has already been at least partially treated in a catalyst zone upstream of the trap, the quantity of unburned hydrocarbons in the exhaust gas stream is low, even when the desorbed hydrocarbons are taken into account. Therefore, it seems that the addition of excess air unduly dilutes the unburned hydrocarbons in the exhaust gas stream entering the downstream catalyst zone to a degree that inhibits the activity of the catalyst despite the excess of oxygen in the gas stream by preventing the hydrocarbons from coming into contact with the catalyst material. Second, the addition of large quantities of ambient air tends to cool the exhaust gases and thus lowers the temperature of the downstream catalyst zone. Catalytic activity, being very temperature sensitive, may thus be adversely affected despite the presence of excess air to drive the oxidation reaction. By limiting the addition of supplemental air to that which maintains a stoichiometric balance in the exhaust gas stream, the unburned hydrocarbons are not overly diluted by the added air and the temperature of the exhaust gas stream is not significantly reduced. As a result, catalyst performance in the conversion of unburned hydrocarbons is maximized.

An additional benefit of the invention is realized when the downstream catalyst zone comprises a three-way catalyst. In such case, the downstream catalyst zone not only optimally minimizes hydrocarbon emissions but also reduces nitrogen oxides that may have passed untreated through the upstream catalyst zone. Further, the presence in the system of a second catalyst effective for the reduction of nitrogen oxides permits the design of the exhaust system to provide an upstream $NO_X$-reducing catalyst of reduced mass.

While the illustrated embodiment shows both a thermocouple 18 and a sensor 26 with associated controllers, the invention may be practiced using either individually. Similarly, while each controller is operably connected to both air pump 22 and engine control module 24, the invention may be practiced by connecting the appropriate controller to either of these air injection means alone. Also, while the illustrated embodiment shows that the upstream catalyst zone and the downstream catalyst zone are contained in a dual path heat exchange catalyst member, this is not a limitation on the invention. In other embodiments, the upstream catalyst zone and the downstream catalyst zone may comprise physically separate catalyst members disposed on opposite sides of the hydrocarbon trap, in a linear flow arrangement. However, a heat exchange arrangement is advantageous in that heat from the exhaust gases entering the upstream catalyst zone and heat produced by the catalyst activity in the upstream catalyst zone is transferred to the downstream catalyst zone. As a result, the exhaust gases entering the trap are cooler than they would otherwise be, and so will not raise the temperature of the trap to its desorption temperature as quickly. In addition, the heat from the first catalyst zone heats the downstream catalyst zone more quickly to its light-off temperature than it would be in a linear arrangement, thus enabling it to convert more of the hydrocarbons that are desorbed from the trap. Preferably, the trap is located in a downstream position relative to the engine, e.g., in the underfloor position, near the tailpipe, to allow the exhaust gases to cool somewhat after leaving the engine and before entering the trap, thus prolonging the adsorption period.

EXAMPLE 1

The exhaust system of a 1993 Mazda 626 automobile was modified by placing a monolithic dual path heat exchange catalyst member in place of the conventional catalytic converter in the underfloor position. Both passes of the heat exchange catalyst member were coated with a conventional three-way catalyst comprising 40 g/ft$^3$ of platinum and rhodium in a ratio of 5:1 dispersed on an alumina support material at a washcoat loading of 1.97 g/in$^3$. The total volume of the catalyst member was 180 in$^3$ and the catalytic material was divided equally between the two catalyst zones. Between passes of the heat exchange catalyst member, the exhaust gas stream was passed through a hydrocarbon trap. The trap comprised a Beta-zeolite adsorbent coated on a ceramic honeycomb monolith having 400 cells/in$^2$ and a total volume of 110 in$^3$, at a loading of 2 g/in$^3$. An additional catalyst volume was placed upstream of the heat exchange catalyst member. The catalyst comprised 35 g/ft$^3$ platinum and rhodium in a 5:1 ratio dispersed on an alumina support material at a washcoat loading of 1.99 g/in$^3$. The total volume of the heat exchange catalyst member was 33 in$^3$ and the cell density was 300 cpsi.

A series of tests was performed in which air was added to the exhaust gas stream at a point immediately downstream of the trap. The tests conformed to the U.S. 75 FTP (Federal Test Procedure) urban dynamometer driving schedule as described at 40 CFR Part 86 Sections 115–178, which includes a test interval during which the air/fuel combustion mixture on which the engine operates is stoichiometric, i.e., during which $\lambda=1$. For purposes of comparison, one test was performed without adding air to the exhaust gas stream. In the other trials, supplemental air was added starting 175 seconds into the test procedure, for an interval of 160 seconds, referred to herein as the "test interval". The addition of supplemental air was varied by controlling the volume rate of air injection, which ranged from 0 to about 1 liter per second. At each rate of air injection, the FTP hydrocarbon emissions were measured. The results are set forth in the graph shown in FIG. 2A, which shows FTP emissions in grams/mile on the vertical axis and standard liters per second ("slps") on the horizontal axis.

Figure 2A:
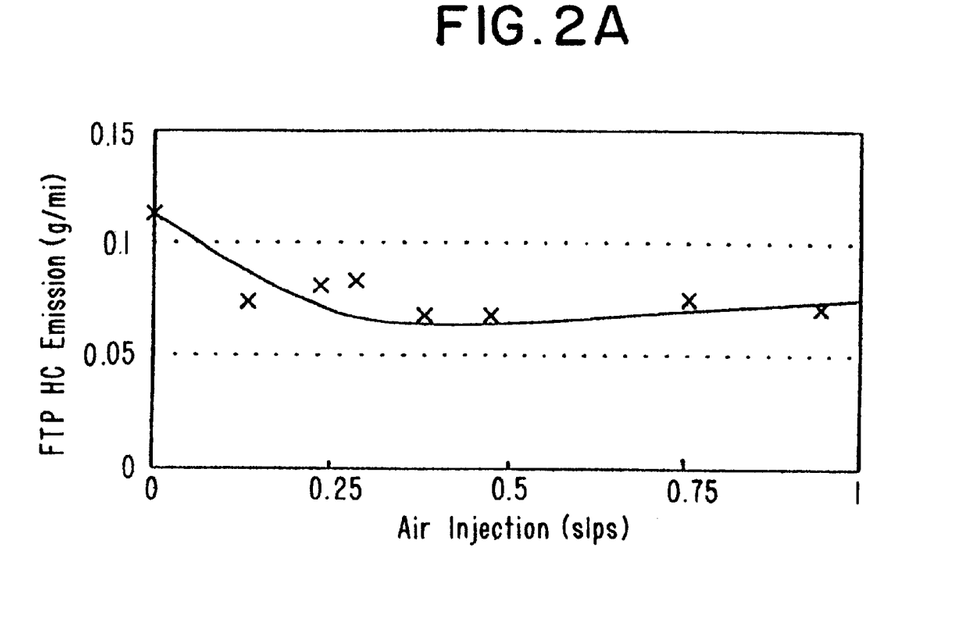
FIG. 2A is a graph of data obtained in Example 1 showing hydrocarbon emissions from an exhaust system as measured at various air injection rates.

The graph of FIG. 2A shows that cold-start hydrocarbon emissions are minimized when the addition of supplemental air is limited to about 0.38 liters per second, emissions being greater for greater and lesser rates of air injection rates.

To determine how air injection rates affect the stoichiometry of the exhaust gas stream, a gas sample probe was placed in the exhaust gas stream at a point downstream of the trap and the air injection port, and just upstream from the downstream catalyst zone. The composition measurements were used to calculate, by standard methods known in the art, the air/fuel ratio index variable X of the exhaust gas stream inclusive of the desorbed hydrocarbons and injected air.

Figure 2B:
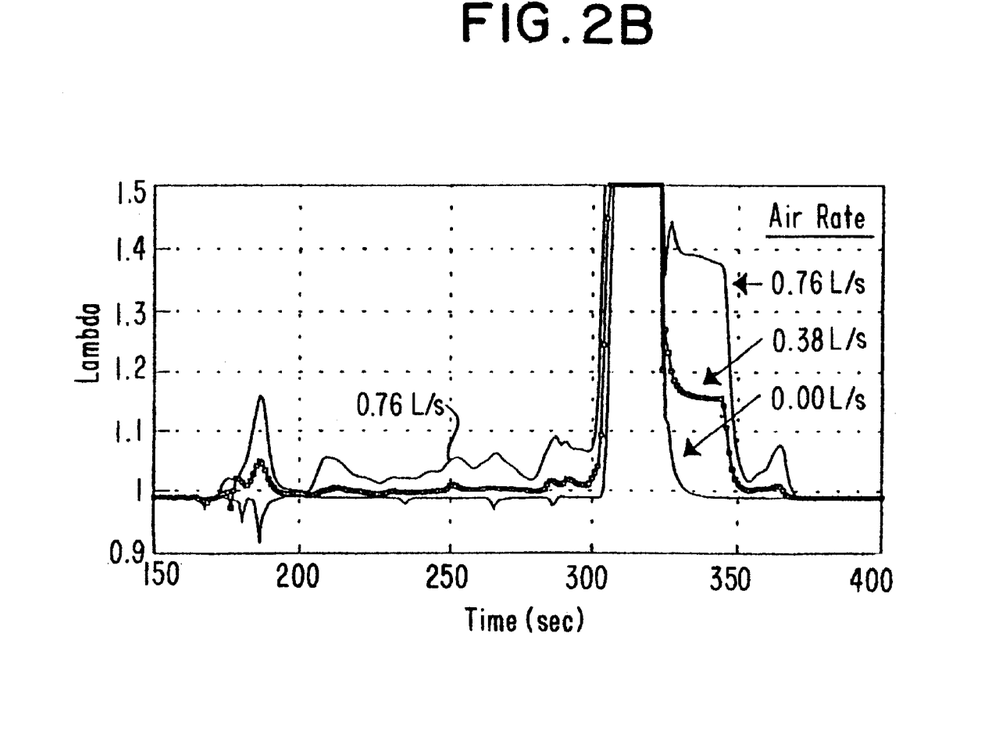
FIG. 2B is a graph showing the air/fuel ratio indexes for combustion mixtures for the system of Example 1 that would produce exhaust gas having the measured oxygen/unburned hydrocarbon ratio resulting from the addition of air and desorbed hydrocarbons to the exhaust gas of a stoichiometric combustion mixture at various air injection rates.

In effect, the $\lambda$ value plotted in FIG. 2B indicates the stoichiometric balance of oxygen, including oxygen from injected-air, to unburned hydrocarbons, including desorbed hydrocarbons in the exhaust gas stream. As can be seen from FIG. 2B, the exhaust gas had a deficit of oxygen over the steady state interval of 200–300 seconds when air was not added, due to the desorption of hydrocarbons adsorbed in an earlier stage of the test. At an air injection rate of 0.76 liters per second, the exhaust gas was "lean", i.e., oxygen rich ($\lambda>1$), and at an air injection rate of 0.38 liters per second, the exhaust gas appeared to have the composition resulting in a stoichiometric air/fuel combustion mixture. A comparison of FIGS. 2A and 2B illustrates that at the air injection rate that minimized hydrocarbon emissions, which rate is evident from FIG. 2A, the air/fuel ratio of the exhaust gas entering the downstream catalyst zone is that of a stoichiometric air/fuel combustion mixture. By comparison, when supplemental air was added at 0.76 liters per second, at which lambda was significantly greater than 1 throughout the test interval (indicating an excess of air), emissions were about 0.075 grams per mile, which is more than when the injection of supplemental air was about 0.38 liters per second. Thus, it is shown that by adding air in an amount that restores the exhaust gas stoichiometry otherwise offset by the desorption of unburned hydrocarbons from the trap, catalytic performance is maximized.

EXAMPLE 2

Figure 3A:
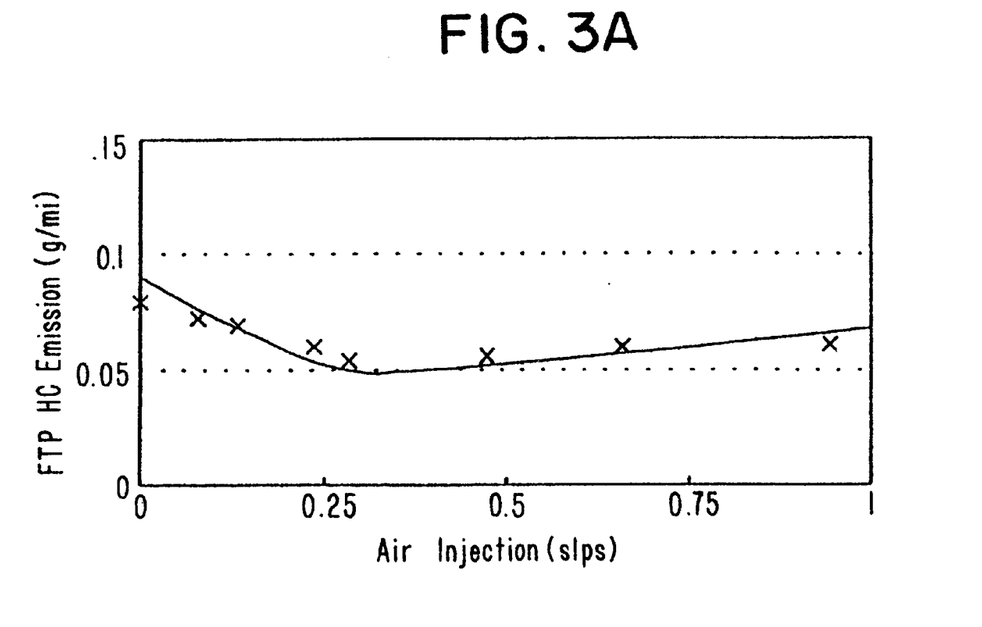
FIG. 3A is a graph of the data obtained in Example 2, showing hydrocarbon emissions from an exhaust system as measured at various air injection rates.
Figure 3B:
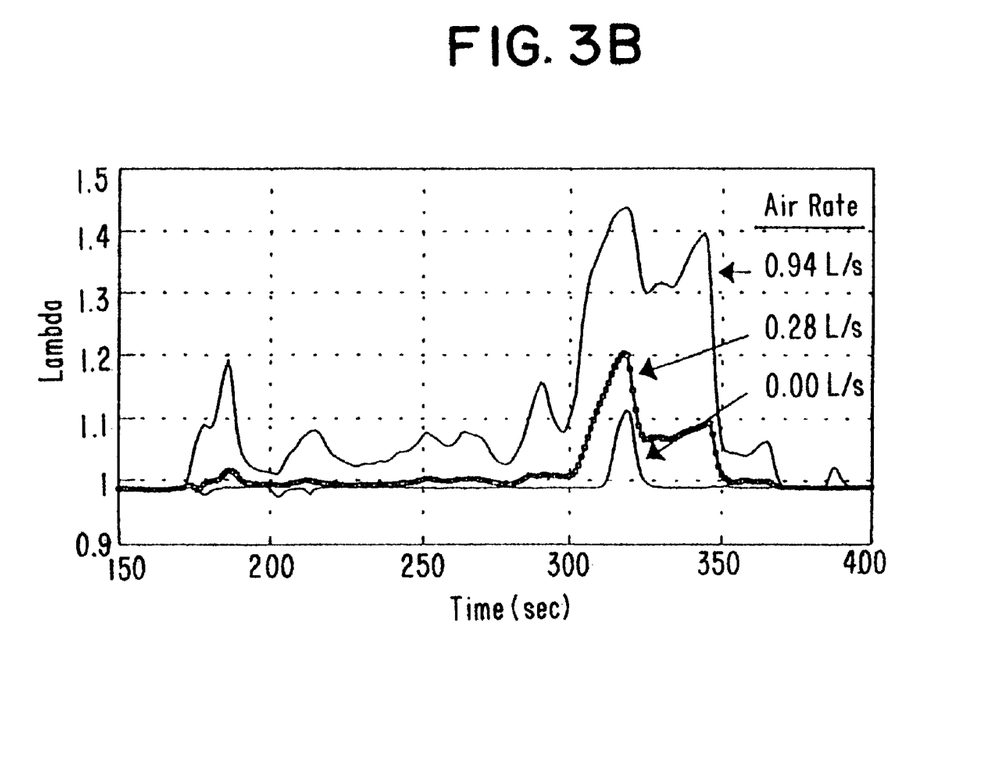
FIG. 3B is a graph showing the air/fuel ratio indexes for the system of Example 2 that would produce exhaust gas having the measured oxygen/unburned hydrocarbon ratio resulting from the addition of air and desorbed hydrocarbons to the exhaust gas of a stoichiometric combustion mixture at various air injection rates.

The experiment of Example 1 was repeated using a 1993 Nissan Altima. A graph showing the measured emissions for various rates of supplemental air injection is shown in FIG. 3A, where it is seen that minimum hydrocarbon emissions occurred at a supplemental air injection rate of about 0.28 liters per second, yielding 0.054 grams per mile FTP hydrocarbon emissions. Emissions were greater for greater and lesser rates of air injection. The stoichiometric analyses of the exhaust gas stream entering the downstream catalyst zone at this rate of air injection, and at a rate of air injection of 0.94 liters per second, and without air injection, are shown in FIG. 3B, where it is seen that $\lambda$ was approximately equal to 1 during most of the test interval for supplemental air addition at 0.28 liters per second. This confirms that hydrocarbon emissions are optimally reduced by limiting the addition of air to that which provides a stoichiometric balance for the unburned hydrocarbons desorbed from the trap.

EXAMPLE 3

A 1993 Ford Taurus having a 3.0 liter engine and 6,500 road miles of prior use was subjected to the U.S. 75 FTP urban dynamometer driving schedule test indicated above. A base test was run on the vehicle as manufactured, using the manufacturer's unmodified, original exhaust system, which comprised a primary catalytic converter located in an underfloor position. The exhaust system was then modified by the installation of a dual path heat exchange catalyst member and hydrocarbon trap system as described in Example 1 downstream from the primary catalytic converter, and a test was run without adding any air. Tests were then run with the addition of supplemental air to the exhaust gas stream at a rate of 1.6 liters per second at three different points in the exhaust system. The air injection points were as follows.

Point A was upstream of the primary catalytic converter; point B was between the first pass of the heat exchange catalyst member and the hydrocarbon trap, just upstream of the trap, and point C was immediately downstream of the trap and upstream of the second pass of the heat exchange catalystic member. Corresponding air injection positions are indicated in FIG. 1. The total emissions in each case were calculated from modal analysis of the FTP results, and are set forth in the following TABLE.

TABLE

| Exhaust System | Air Addition Point | FTP THC * Emission (g/mile) |
| --- | --- | --- |
| Unmodified | None | 0.148 |
| Modified | None | 0.120 |
| Modified | A | 0.105 |
| Modified | B | 0.099 |
| Modified | C | 0.082 |

*"THC" = Total Hydrocarbons

As can be seen from the TABLE, emissions were lowest when supplemental air was injected at point C, between the hydrocarbon trap and the second pass of the heat exchange catalyst member.

While the invention has been described in detail with reference to particular embodiments thereof, it will be apparent upon a reading and understanding of the foregoing that numerous alterations to the described embodiments will occur to those skilled in the art, and it is intended to include such alterations within the scope of the appended claims.

What is claimed is:

1. In a method for treating automotive engine exhaust gases produced by combusting an air/fuel combustion mixture, the method comprising;
   flowing the exhaust gases through a hydrocarbon trap;
   adsorbing hydrocarbons in the trap during a cold-start period; and
   desorbing hydrocarbons from the trap during a subsequent hydrocarbon desorption operating period; and
   flowing the exhaust gases through a downstream catalyst zone located downstream of the trap, the downstream catalyst zone comprising a catalyst effective at least for oxidizing hydrocarbons, the improvement comprising:
   adding supplemental air at a point downstream of the trap, to the exhaust during the hydrocarbon operating desorption period of the trap to maintain a substantially stoichiometric air/fuel balance in the exhaust gases flowing into the downstream catalyst zone; and
   flowing the exhaust gases through an upstream catalyst zone disposed in the exhaust gas stream upstream of the trap, the upstream catalyst zone comprising a catalyst effective to convert one or more of carbon monoxide, hydrocarbons and nitrogen oxides in the exhaust gas steam to innocuous substances, wherein
   the upstream catalyst zone and the downstream catalyst zone are in mutual heat exchange relation with each other and wherein the trap is disposed in the exhaust gas stream between the upstream and downstream catalyst zones.

2. The method of claim 1 further comprising the step of adding supplemental air comprises adding supplemental air to the combustion mixture for the engine.

3. The method of claim 1 wherein the downstream catalyst zone consists essentially of an oxidation catalyst.

4. The method of claim 1 wherein the downstream catalyst zone comprises a three-way catalyst. downstream catalyst zone.

5. In a method for treating automotive engine exhaust gases produced by combusting an air/fuel combustion mixture, the method comprising;
   flowing the exhaust gases through a hydrocarbon trap;
   adsorbing hydrocarbons in the trap during a cold-start period; and
   desorbing hydrocarbons from the trap during a subsequent hydrocarbon desorption operating period; and
   flowing the exhaust gases through a downstream catalyst zone located downstream of the trap, the downstream catalyst zone comprising a catalyst effective at least for oxidizing hydrocarbons, the improvement comprising:
   sensing a quantity of hydrocarbons desorbed by the trap;
   adding supplemental air, at one of the engine and a point downstream of the trap, during the hydrocarbon operating desorption period of the trap at a rate that provides a substantially stoichiometric balance with hydrocarbons, including the sensed quantity of desorbed hydrocarbons, in the exhaust gases flowing into the downstream catalyst zone; and
   flowing the exhaust gases through an upstream catalyst zone disposed in the exhaust gas stream upstream of the trap, the upstream catalyst zone comprising a catalyst effective to convert one or more of carbon monoxide, hydrocarbons and nitrogen oxides in the exhaust gas steam to innocuous substances, wherein
   the upstream catalyst zone and the downstream catalyst zone are in mutual heat exchange relation with each other and wherein the trap is disposed in the exhaust gas stream between the upstream and downstream catalyst zones.

6. The method of claim 5 wherein the step of adding supplemental air comprises adding supplemental air to the exhaust gases at a point downstream of the trap.

7. The method of claim 5 wherein said step of sensing the quantity of desorbed hydrocarbons comprises sensing one of (a) the air/fuel ratio of the exhaust gases flowing from the trap, (b) the hydrocarbon content of the exhaust gases flowing from the trap, and (c) the temperature of the exhaust gases entering the trap.

8. The method of claim 5 wherein the downstream catalyst zone consists essentially of an oxidation catalyst.

9. The method of claim 5 wherein the downstream catalyst zone comprises a three-way catalyst.

10. The method of claim 5 wherein the step of adding supplemental air comprises adding supplemental air to the combustion mixture for the engine.

11. In an exhaust gas treatment system defining a flow path for an exhaust gas stream and comprising at least a hydrocarbon trap downstream of a first upstream catalyst zone, the hydrocarbon trap adsorbs and desorbs unburned hydrocarbons and a second downstream catalyst zone comprising a catalyst disposed in the flow path downstream of the trap effective at least for oxidizing hydrocarbons, the improvement comprising;
   sensor/controller means operably connected to the treatment system for sensing when the trap is desorbing hydrocarbons, for sensing the quantity of hydrocarbons in the exhaust gas stream, including the desorbed hydrocarbons, and for issuing an air injection signal when the exhaust gas stream is fuel-rich; and
   air injection means responsive to the air injection signal of the sensor/controller means, for increasing the air content of the exhaust gas stream so that a substantially stoichiometric air/fuel mixture flows to the downstream catalyst zone.

12. The system of claim 11 wherein the sensor means comprises one of an air/fuel ratio sensor and a hydrocarbon sensor.

13. The system of claim 12 wherein the sensor means comprises an air/fuel ratio sensor and is connected to the system at a point downstream of the point where the air injection means adds air to the exhaust gas stream.

14. The system of claim 11 wherein the air injection means comprises an engine control module that is responsive to the sensor means.

15. The system of claim 11 wherein the air injection means comprises an air pump for injecting air into the flow path at a point downstream from the trap.

16. The system of claim 11 wherein the downstream catalyst zone comprises a three-way catalyst.

17. The system of claim 11 wherein the downstream catalyst zone comprises a catalyst material consisting essentially of an oxidation catalyst.

18. In a method for treating automotive engine exhaust gases produced by combusting an air/fuel combustion mixture, the method comprising;

flowing the exhaust gases through a hydrocarbon trap;

adsorbing hydrocarbons in the trap during a cold-start period; and desorbing hydrocarbons from the trap during a subsequent hydrocarbon desorption operating period; and flowing the exhaust gases through a downstream catalyst zone located downstream of the trap, the downstream catalyst zone comprising a catalyst effective at least for oxidizing hydrocarbons, the improvement comprising:

adding supplemental air, at one of the engine and a point downstream of the trap, to the exhaust during the hydrocarbon operating desorption period of the trap to maintain a substantially stoichiometric air/fuel balance in the exhaust gases flowing into the downstream catalyst zone;

operating the engine at an air/fuel combustion mixture in the lean to stoichiometric range; and flowing the exhaust gases through an upstream catalyst zone disposed in the exhaust gas stream upstream of the trap, the upstream catalyst zone comprising a catalyst effective to convert one or more of carbon monoxide, hydrocarbons and nitrogen oxides in the exhaust gas steam to innocuous substances, wherein the upstream catalyst zone and the downstream catalyst zone are in mutual heat exchange relation with each other and wherein the trap is disposed in the exhaust gas stream between the upstream and downstream catalyst zones.

19. The method of claim 18 wherein the downstream catalyst zone consists essentially of an oxidation catalyst.

20. The method of claim 18 wherein the downstream catalyst zone comprises a three-way catalyst.

21. The method of claim 18 wherein the step of adding supplemental air comprises adding supplemental air to the exhaust gases at a point downstream of the trap.

* * * * *